United States Patent Office 2,738,310
Patented Mar. 13, 1956

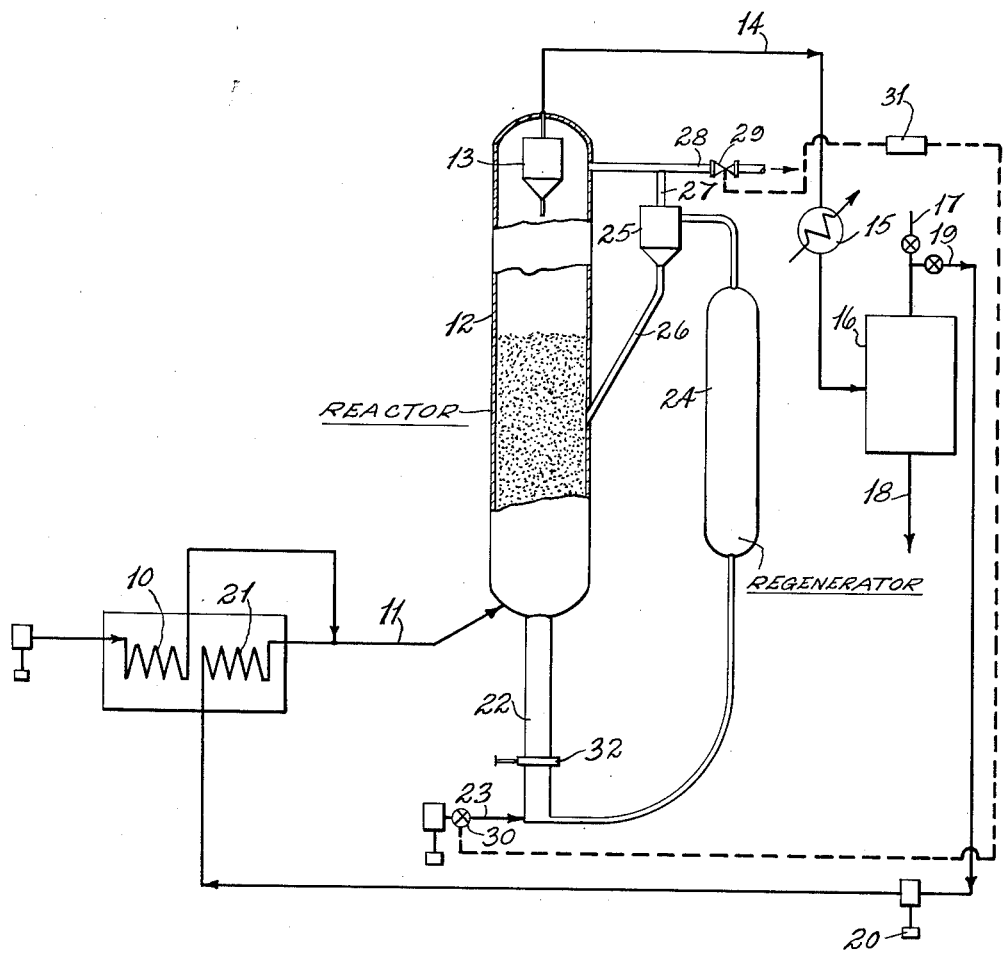

2,738,310

CATALYTIC CONVERSION OF HYDROCARBONS WITH PRESSURE REGULATION IN THE CONVERSION AND REGENERATION ZONES

Halsted R. Warrick, Pleasantville, N. Y., assignor to The Texas Company, New York, N. Y., a corporation of Delaware Application January 4, 1952, Serial No. 264,888

2 Claims. (Cl. 196—52)

This invention relates to the catalytic conversion of hydrocarbons and is concerned with certain improvements in catalytic systems in which the hydrocarbons are contacted with solid catalysts in a reactor under fluidized conditions and in which used catalyst is directed to a regenerator for reactivation and recycled to the reactor.

The invention contemplates processing the hydrocarbon in a reactor, regenerating the catalyst in a separate chamber and maintaining the reactor and regenerator in free and open communication in the gaseous or vaporous phase so as to maintain substantially the same pressure in the reactor and regenerator. In accordance with the invention the effluent gases from the regenerator are withdrawn from the system through a conduit which is in open communication with the reactor and the rate of withdrawal of such gases from the system is regulated so that there will be no material flow of gases or vapors from the reactor to the regenerator.

While the invention is adapted for conducting the catalytic treatment of hydrocarbons at relatively low pressures, it is especially adapted for high pressure operations, such for example as pressures of 200 lbs. or higher. In fluid catalyst cracking operations in which catalyst is transferred from the reactor to the regenerator and from the regenerator to the reactor employing the usual columns of catalyst in standpipes, the pressure differential between the reactor and regenerator as a practical matter does not ordinarily exceed about 5 pounds and consequently in high pressure operations a relatively small percentage change in the pressure of the reactor or the regenerator may well be sufficient to overcome a pressure head of catalyst in the system and cause a reversal of the proper flow. In accordance with the present invention this danger is obviated by the free and open communication overhead between the reactor and regenerator and the maintenance of substantially the same pressure in both.

An important feature of the invention is that while the regenerator and reactor are held under the same pressure, nevertheless, each is maintained essentially separate from the other and, although the two chambers are in open overhead communication, the withdrawal of the gases and vapors is controlled so as to avoid loss in product gases and vapors by inclusion with the regenerator effluent. A slightly higher pressure in the regenerator, a mere fraction of a pound, is sufficient to ensure that there will be no loss in product gases or vapors by flowing out with the regenerator gases. It is desirable to maintain separate withdrawal of the vaporous products from the reactor and the gaseous effluent from the regenerator so as to avoid the necessity of subsequently separating these materials. Thus, for example, in processes where some of the product gas, such as hydrogen, is recycled to the reactor it would be necessary to pass the composite gases from the reactor and regenerator through an absorber to remove the carbon dioxide so that the hydrogen fraction recycled to the reactor would be free from such gas. The present invention makes it unnecessary to resort to such procedure.

The invention is adapted for the cracking or conversion of higher boiling hydrocarbon oils into lower boiling products, such as gasoline, and it is particularly adapted for the catalytic reforming of gasoline or naphtha conducted with hydrogen recycle.

In the practice of the invention the hydrocarbons are contacted with the catalyst under fluidized conditions in the reactor, the gaseous and vaporous products are withdrawn overhead and used catalyst is withdrawn from the reactor through a standpipe, fluidized with oxygen or air or other oxygen containing gas and subjected to regeneration by burning in the regenerator. The reactivated catalyst is separated from the effluent regenerator gases and delivered to the reactor through a standpipe, and the separated gases are separately withdrawn through a conduit which is in open communication with the reactor.

In the further description of the invention reference is had to the accompanying drawing, which is a flow diagram partly sectionalized of an operation embodying the invention.

The hydrocarbon charging stock is passed through a heating coil 10 and delivered through transfer line 11 to a reactor 12, preferably entering the reactor at a lower point thereof. In the reactor the hydrocarbon is subjected to conversion in contact with comminuted solid catalyst under fluidized conditions. A dense bed of fluidized catalyst is maintained throughout a large section of the reactor with a dilute phase in the upper section thereof. The vaporous and gaseous products of the reaction pass through a cyclone 13 thence through vapor line 14 and condenser 15 to a distillate receiver or gas separator 16. The liquid products are removed through line 18. The separated gas is removed through a line 17. When it is desired to recycle gas, such as a gaseous fraction rich in hydrogen, the gas is conducted through a branch line 19 and directed by a pump 20 through heating coil 21 and the heated gas is commingled with the heated charging stock in the transfer line 11 for introduction to the reactor 12. When recycling gas through line 19 to the conversion system a portion of the gas effluent from separator 16 is regularly withdrawn through line 17.

Used catalyst descends from the reactor 12 through a standpipe 22 having a slide valve 32 and heated air or other oxidizing gas directed through line 23 fluidizes catalyst from the standpipe and the fluidized stream is conducted to the regenerator 24 wherein the carbon or coke deposited on the catalyst in the reactor is burned to effect reactivation of the catalyst. The gases of combustion together with the catalyst pass overhead to a cyclone or separator 25. The separated catalyst descends from the separator through a line 26 to the reactor 12. The delivery of catalyst to the reactor is accomplished by the pressure head of the column of catalyst in the line 26 which line preferably terminates well within the dense phase portion of the reactor. The separated gases are removed from the separator 25 through pipes 27 and 28. The line 28 is in open communication with the reactor 12 and is provided with a valve 29. Due to the open communication between the reactor 12 and regenerator 24 or its separator 25 substantially the same pressure will exist in both the reactor and regenerator. The valve 29 is controlled so as to permit removal of gases from separator 25 at approximately the rate of formation and so as to prevent any substantial flow of gases from the reactor 12 into the pipe 28. It is advantageous to control the valve 29 in response to the rate of air or oxygen introduction through the line 23. Thus a flow controller 31 may be provided to control the valve 29 in response to the movement of a valve 30 in the line 23. In order to insure no loss of products from the reactor it is best to regulate the valve 29 so as to take off somewhat less than the total products of combustion, such as about 85–95% of the total flue gas. Thus there will be a relatively small percentage of gas from the regenerator that will pass out with the products from the reactor, but this small percentage will not seriously interfere with the fractionation of the products from the reactor and will not cause any impairment of the conversion reactions when recycling gas. When operating with gas recycle a small portion of the gas is withdrawn from the system through line 17 to prevent the build-up of any harmful concentration of carbon dioxide or other products of combustion in the gases being recycled to the reactor.

The invention is adapted for application with any of the solid catalysts employed in the cracking or conversion of hydrocarbon oils and with the usual temperature conditions. These temperatures are usually above 850° F. and generally in the 900° F. and 1000° F. temperature levels. While low pressures may be used there is usually more to be gained by the practice of the invention when applied to the higher pressure operations, such as 200 pounds and higher.

The invention is of especial advantage in hydroforming operations having relatively low coke lay down on the catalyst, such as 1% or less by weight of the feed. Thus in a fluid catalyst hydroforming operation charging a 200–350° F. mixed base straight run naphtha and using a molybdena-alumina gel catalyst at about 900° F. and 200 p. s. i. g. and producing a 400° F. end point gasoline having a clear C. F. R. octane of 85 and 10 lbs. R. V. P., the coke deposited on the catalyst approximates 0.5 wt. per cent basis feed and the dry product gas ($C_3$ and lighter), which is recycled, is about 6.4 wt. per cent with a hydrogen content of 85 mol per cent. The following table indicates the amount of gaseous products formed in the hydroforming operation and in the regeneration of the catalyst on the basis of 100 bbls. charge (270# bbl.):

| | |
|---|---|
| Total mols dry product gas | 210 |
| Total mols coke (mole wt. 13) | 10.4 |
| Mols $O_2$ required to burn coke | 13.0 |
| Mols $N_2$ associated with the $O_2$ | 52.0 |
| Mols $CO_2$ formed | 10.4 |
| Total flue gas | 62.4 |
| Total composite gas | 272.4 |

Thus of the total composite gas, i. e., the product gas and the gas produced by the coke burning, the flue gas or inerts amount to 22.9 mol per cent. If this flue gas were allowed to mingle with the product gas, which is recycled, the large proportion of inerts would decrease the efficiency of the reaction; it would in fact be necessary to treat the composite gas to remove the inerts before recycling. On the other hand by operating in accordance with the invention with separate removal of about 90% of the flue gas and allowing only some 10% of the flue gas to combine with the product gas the inert portion of the recycle gas is only 2.89 mol per cent as indicated in the following table:

| | |
|---|---|
| Mols dry product gas | 210 |
| Mols $CO_2$ | 1.04 |
| Mols $N_2$ | 5.20 |
| Mols flue gas in recycle gas | 6.24 |
| Total mols recycle gas | 216.24 |
| Inerts in recycle gas_____mol per cent | 2.89 |

This small amount of inerts can be tolerated without noticeable effect on the operation. By using oxygen, instead of air, for regenerating the catalyst the amount of inerts in the recycle gas can be further reduced:

| | |
|---|---|
| Mols dry product gas | 210 |
| Mols $CO_2$ | 10.4 |
| Total mols composite gas | 220.4 |
| Inerts in total composite gas_____mol per cent | 4.7 |

With 90% separate removal of flue gas:

| | |
|---|---|
| Mols $CO_2$ | 1.04 |
| Total mols recycle gas | 211.04 |
| Inerts in recycle gas_____mol per cent | 0.49 |

In a modification of the system shown in the drawing the line 27 is connected directly to the regenerator 24 and the separator 25 is disposed in the line 28 beyond its junction with line 27. The flow control valve in the line 28 is omitted and a flow control valve is inserted in the gas line from the separator. The catalyst from the separator is run back through a standpipe to the dense phase section of the reactor or is fluidized with a portion of the charge hydrocarbon to the reactor or with recycle gas and returned to the reactor. This arrangement reduces the small pressure differential between the regenerator and reactor by eliminating the slight pressure drop through the separator.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the catalytic conversion of hydrocarbons the process that comprises contacting the hydrocarbons in a reaction chamber with solid catalyst under fluidized conditions with the formation of a dense phase in the lower portion of the reaction chamber and of a dilute phase in the upper portion thereof, removing reaction vapors overhead from the reaction chamber, withdrawing catalyst from the bottom of the reaction chamber through a standpipe, conducting catalyst from said standpipe in a stream of oxygen containing gas to a regenerating chamber and subjecting the catalyst to regeneration therein under fluidized conditions, passing resultant gaseous products of combustion and reactivated catalyst from the regenerating chamber to a separator wherein the reactivated catalyst is separated from the gaseous products, delivering the separated catalyst from the separator through a standpipe to the dense phase section of the reaction chamber, removing separated gaseous products from the separator through a pipe conduit in communication with the upper portion of the reaction chamber so that the reaction and regenerating sides of the system are maintained under approximately the same pressure, and withdrawing the gaseous products of combustion from the system through said pipe conduit at such a rate that not exceeding a relatively small proportion of said gaseous products is permitted to enter the reaction chamber and substantially none of the vapors from the reaction chamber leave the system with said gaseous products of combustion through the pipe conduit.

2. In a catalytic conversion of hydrocarbons the process that comprises contacting the hydrocarbons in a reaction chamber with solid catalyst under fluidized conditions with the formation of a dense phase in the lower portion of the reaction chamber and of a dilute phase in the upper portion thereof, removing reaction vapors overhead from the reaction chamber, subjecting said vapors to fractionation to obtain liquid and normally gaseous fractions, recycling a portion of the gaseous fraction to the reaction chamber, discharging the other portion from the system, withdrawing catalyst from the bottom of the reaction chamber through a standpipe, conducting catalyst from said standpipe in a stream of oxygen containing gas to a regenerating chamber and subjecting the fluidized catalyst to regeneration therein under fluidized conditions, passing resultant gaseous products of combustion and reactivated catalyst from the regenerating chamber to a separator wherein the reactivated catalyst is separated from the gaseous products, delivering the separated catalyst from the separator through a standpipe to the dense phase section of the reaction chamber, removing separated gaseous products from the separator through a pipe conduit in communication with the upper portion of the reaction chamber so that the reaction and regenerating sides of the system are maintained under approximately the same pressure, and withdrawing the gaseous products of combustion from the system through said pipe conduit at such a rate that not exceeding a relatively small proportion of said gaseous products is permitted to enter the reaction chamber and substantially none of the vapors from the reaction chamber leave the system with said gaseous products of combustion through the pipe conduit.

References Cited in the file of this patent

UNITED STATES PATENTS

| Number | Name | Date |
|---|---|---|
| 2,420,129 | Flock et al. | May 6, 1947 |
| 2,450,753 | Guyer | Oct. 5, 1948 |
| 2,468,508 | Munday | Apr. 26, 1949 |
| 2,584,378 | Beam | Feb. 5, 1952 |